Dec. 9, 1930.   C. ROBERTS   1,783,980
CUSHION TREAD FOR FOOTWEAR
Filed Nov. 14, 1925
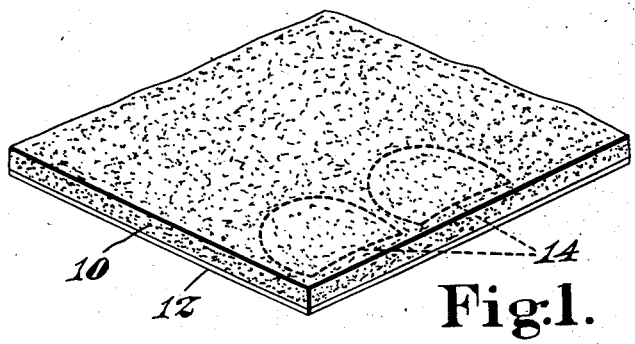
Fig.1.
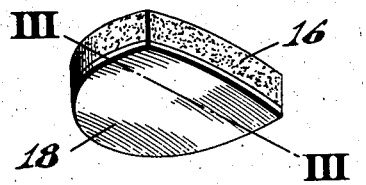
Fig.2.
Fig.3.
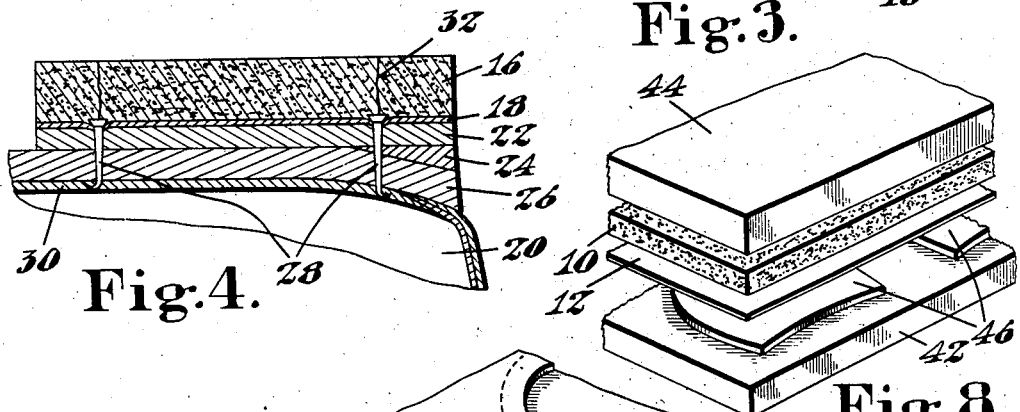
Fig.4.
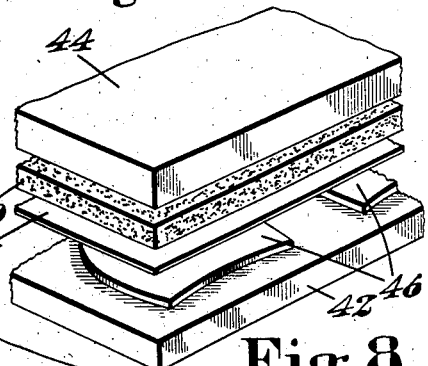
Fig.8.
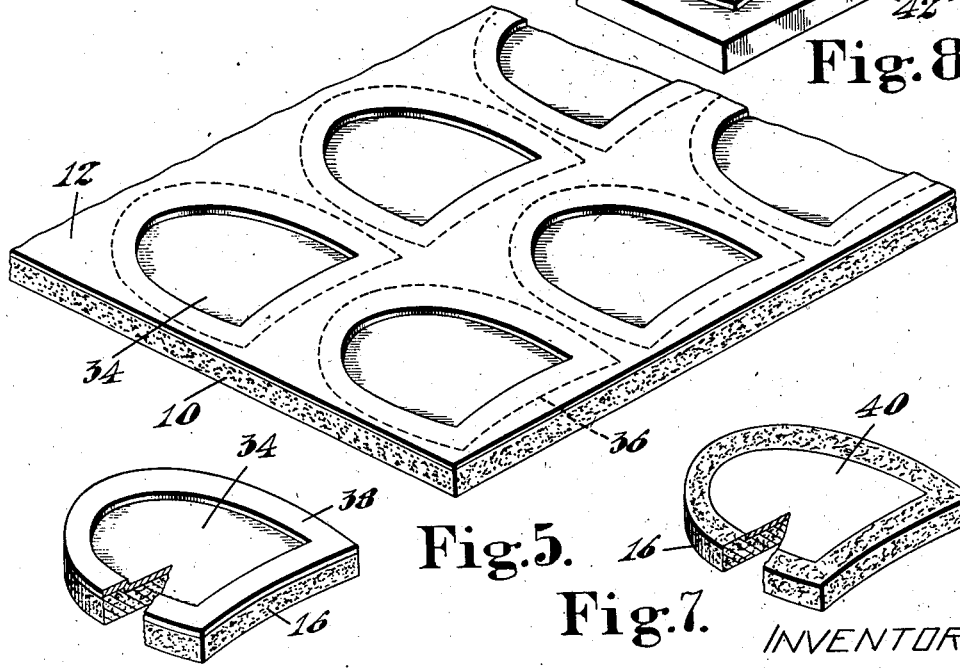
Fig.5.
Fig.6.
Fig.7.
INVENTOR Patented Dec. 9, 1930

1,783,980

UNITED STATES PATENT OFFICE

CLIFFORD ROBERTS, OF WINCHESTER, MASSACHUSETTS, ASSIGNOR TO UNITED SHOE MACHINERY CORPORATION, OF PATERSON, NEW JERSEY, A CORPORATION OF NEW JERSEY

CUSHION TREAD FOR FOOTWEAR

Application filed November 14, 1925. Serial No. 69,192.

This invention relates to cushion treads for footwear and has for its object the provision of an improved method of making resilient tread members such, for example, as heels, soles, or the like, which has material advantages in respect to ease and rapidity of production, at a substantial saving in cost.

With the foregoing in view the invention, in one aspect, provides a novel method of making concavo-convex cushion treads by securing a layer of yielding rubber to a sheet of less yielding material, cutting treads from the composite sheet thus formed, and then forming said material to concavo-convex shape. The less yielding material, which constitutes a backing and nail holding element of the tread, may advantageously consist of soft metal and the sheet of metal with rubber vulcanized to it may be made quite large. From this composite sheet cushion treads may be cut out with an ordinary cutting die operating upon a flat cutting block, the die acting to bend or curve the metal around the entire edge of the cut-out portion and, simultaneously with the cutting, imparting a concavo-convex shape to the tread.

By this method there are produced individual treads, having the well known advantages in respect to ease of attachment and the production of tight edge joints which are afforded by the concavo-convex shape, without the necessity for a large and expensive equipment of individual concavo-convex vulcanizing molds.

In another aspect the invention provides an improved method of making a cushion tread with a concealed metallic backing, according to which a depression of less area than the desired tread and of a depth at least equal to the thickness of the metal is formed in one face of a metal plate, a body of rubber is vulcanized to the plate, a tread died out of the composite sheet thus produced, and the metal removed from the marginal portion of the attaching face of the tread, around the depression therein.

The invention also includes a step-product consisting of a composite sheet of soft metal and rubber vulcanized together, the metal having in its outer face a series of regularly arranged, heel shaped depressions of a depth at least equal to the thickness of the metal. Such a sheet may be easily and conveniently handled and heel treads may be rapidly and economically cut out of it with an ordinary die.

The invention and its advantages will be better understood and appreciated from reading the following detailed description, in connection with the accompanying drawings, in which—

Fig. 1 is a perspective view of a fragment of one corner of a composite sheet of rubber and metal vulcanized together;

Fig. 2 is a perspective view of a cushion tread died out of the sheet illustrated in Fig. 1, and particularly designed to serve as a top lift for a wooden heel;

Fig. 3 is a cross sectional view taken on the line III, III of Fig. 2;

Fig. 4 is a longitudinal section of the heel end of a shoe showing a rubber half heel made according to the invention and attached in connection with an ordinary heel base;

Fig. 5 is a view similar to Fig. 1, illustrating a modification and development of the invention;

Fig. 6 is a view, partly in perspective and partly in section, of a blank cut from the composite sheet shown in Fig. 5 in an unfinished state;

Fig. 7 is a view similar to Fig. 6 showing the heel resulting from the finishing of the blank shown therein; and Fig. 8 is a perspective view illustrating an arrangement which may be employed for manufacturing the composite sheet shown in Fig. 5.

A fragment of a composite sheet of rubber and metal is illustrated in Fig. 1 in which 10 indicates a layer of rubber of suitable thickness and 12 indicates a plain sheet of metal, to the surface of which the rubber layer is vulcanized and permanently bonded. This vulcanization of a layer of rubber to a sheet of metal is being successfully practised upon a commercial scale and is made possible of accomplishment by proper treatment of the sheet metal before the unvulcanized rubber compound is applied to it. While any suitable agent may be used, very satisfactory results have been secured by treating the surface of a metal sheet, preliminarily to the vulcanization of the rubber thereto, with a phenolic condensation cementing material such, for example, as bakelite varnish mixed with ten per cent, more or less, of phenol; or by treating the metal surface according to the method disclosed in United States Letters Patent No. 1,617,588, granted Feb. 15, 1927, upon the application of William C. Geer. The composite sheet thus produced may be of indefinite area, limited only by the size of the vulcanizing press which may be available. The dotted heel shaped outlines 14 indicate how complete heels may be cut, with a die or other suitable tool, directly from the composite sheet.

In Figs. 2 and 3 there is illustrated a cushion top lift cut from such a composite sheet as has been described, said top lift comprising a soft and elastic body 16 of rubber having solidly secured to its attaching face, solely by vulcanization, a relatively thin, metallic plate 18.

The plate 18 serves to anchor the heads of the nails used to attach the lift to a heel and, in order that the attaching nails may be readily driven through it, should consist of metal soft enough to be readily penetrable by the points of the nails but sufficiently strong to anchor the heads of the nails securely. It should also be readily penetrable by a cutting die, in order that the heels may be rapidly produced from the composite sheet without difficulty or undue wear of the cutting die and the machine in which it is used, and if the plate extends to the edge of the lift it should be capable of being cut by the cutters generally used in heel trimming machines. One metal which may be successfully employed for the purpose described is sheet aluminum, which has been used with satisfactory results.

By cutting out the lift shown in Figs. 2 and 3 with a cutting die operating upon a flat surfaced cutting block the metal sheet or plate 18 will be slightly bent or curved, as shown in the drawing, around its entire edge, and, as the relatively yielding rubber layer 16 adheres permanently to it, the resulting heel or lift is somewhat concavo-convex, as illustrated in the drawing. This concavo-convex shape aids greatly in securing and maintaining a tight edge joint between the heel and the surface to which it is attached.

In Fig. 4 a half heel, made as above described, is shown attached to the heel end of a shoe 20 in connection with a heel base of ordinary construction consisting of a leather lift 22 and a rand 24 engaging the heel seat end of the outer sole 26 of the shoe. The attaching nails 28, as shown, are driven from the outside, their points being clinched in the insole 30 of the shoe. The nails may be driven anywhere in the heel, inasmuch as no definitely located holes need be found and the soft rubber of the layer 16 closes over the nail heads after the drivers are withdrawn. The pressure applied in the nailing operation substantially flattens the tread member, which is securely held in position by the attaching nails.

If it should be desired that the metallic nail anchoring plate be invisible in the finished shoe, the sheet 12 of metal is formed or molded as illustrated in Fig. 5. A series of regularly arranged, heel shaped depressions 34 of a depth at least equal to the thickness of the metal, and less in area than the area of the desired heel is formed in the sheet 12 and the blanks are died out of the composite sheet, as indicated by the dotted outlines 36. A blank thus produced will have the appearance illustrated in Fig. 6, wherein the attaching face comprises the recessed area 34 surrounded by an elevated marginal portion 38. The marginal portion 38 may be removed, by abrasion, or otherwise, producing the finished heel shown in Fig. 7, having the full thickness of its edge which is to be visible in the finished shoe formed of rubber and having embedded in its attaching face, flush therewith and permanently secured to the rubber solely by vulcanization, a metallic backing or nail anchoring plate 40 which is of less area than said attaching face.

The depressions 34 in the metallic sheet 12 may be formed in any desired manner, as by dies in a stamping press operating upon the sheet before the rubber is applied to it or by a suitably formed mold in the vulcanizing press in which the composite sheet is manufactured.

In Fig. 8 there are illustrated, in separated relation, portions of the base plate 42 and the top plate 44 of a vulcanizing mold, and a layer 10 of rubber composition and a sheet of metal 12 to be vulcanized together. Elevations 46, corresponding in size and shape to the depressions 34, are formed upon, or solidly secured to, the base plate 42 in the spaced relation which it is desired that the depressions shall occupy in the manufactured composite sheet. The pressure applied to the mold in the vulcanizing press under ordinary conditions is sufficient to form the depressions in the metallic sheet during the vulcanizing operation unless the metal sheet is relatively thick or hard, in which case the depressions may be formed in a separate operation, as suggested.

Having thus described my invention, what I claim as new and desire to secure by Letters Patent is:—

1. A step product consisting of a composite sheet of soft metal and rubber vulcanized together, the metal having in its outer face a series of regularly arranged, heel shaped depressions of a depth at least equal to the thickness of the metal.

2. The method of making concavo-convex cushion treads which consists in securing a layer of yielding rubber to a sheet of less yielding material, cutting treads from the composite sheet thus formed, and forming said material to concavo-convex shape.

3. The method of making concavo-convex cushion treads which consists in vulcanizing a layer of rubber to a sheet of soft metal to produce a composite sheet, and then, with a cutting die, simultaneously cutting a tread out of said composite sheet and, by the action of the die, bending the edge of the metal in the tread to produce a tread of concavo-convex shape.

4. The method of making a cushion tread with a concealed metallic backing which consists in forming in one face of a metal plate a depression of less area than the area of the desired tread and of a depth at least equal to the thickness of the metal, vulcanizing to the opposite face of said metal plate a body of rubber to produce a composite sheet, dying out of the composite sheet a tread with said depression located within its attaching face, and freeing said attaching face from said depression by removing the metal from the marginal portion thereof.

In testimony whereof I have signed my name to this specification.

CLIFFORD ROBERTS.